US009788165B2

(12) United States Patent
Bolon et al.

(10) Patent No.: US 9,788,165 B2
(45) Date of Patent: *Oct. 10, 2017

(54) LOCATION INTELLIGENCE MANAGEMENT SYSTEM FOR BORDER SECURITY

(71) Applicant: Comcast Cable Communications, LLC, Philadelphia, PA (US)

(72) Inventors: Brian R. Bolon, West Chester, PA (US); Larry V. Dodds, Chester Springs, PA (US); Matthew L. Ward, Collegeville, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/175,991

(22) Filed: Jun. 7, 2016

(65) Prior Publication Data

US 2016/0373898 A1    Dec. 22, 2016

Related U.S. Application Data

(63) Continuation of application No. 14/057,629, filed on Oct. 18, 2013, now Pat. No. 9,386,421, which is a
(Continued)

(51) Int. Cl.
*H04W 24/08* (2009.01)
*H04W 4/02* (2009.01)
(Continued)

(52) U.S. Cl.
CPC ........... *H04W 4/028* (2013.01); *H04L 63/302* (2013.01); *H04L 67/18* (2013.01); *H04W 4/021* (2013.01); *H04W 24/08* (2013.01)

(58) Field of Classification Search
CPC ....... H04W 4/02; H04W 4/028; H04W 24/08; H04W 4/021; H04W 64/00; H04W 12/02; H04W 36/32; H04W 48/04; H04W 48/18; H04W 4/022; H04W 4/025; H04W 4/043; H04W 4/08; H04W 4/22; H04W 60/02;
(Continued)

(56) References Cited

U.S. PATENT DOCUMENTS 4,728,959 A    3/1988    Maloney et al.
5,317,323 A    5/1994    Kennedy et al.
(Continued)

FOREIGN PATENT DOCUMENTS

WO    WO 02/076118 A1    9/2002

OTHER PUBLICATIONS

International Patent Application No. PCT/US2014/061202; Int'l Search Report and the Written Opinion; dated Feb. 4, 2015; 15 pages.
(Continued)

*Primary Examiner* — Matthew Sams
(74) *Attorney, Agent, or Firm* — Ballard Spahr LLP (57) ABSTRACT

Collection and analysis of network transaction information which includes the mobile device's usage, location, movements coupled with data from non-wireless network sources allow for the automation of analysis for the detection of smuggling or other criminal behaviors and tasking of high-accuracy location surveillance.

28 Claims, 7 Drawing Sheets

Related U.S. Application Data continuation-in-part of application No. 13/490,745, filed on Jun. 7, 2012, now Pat. No. 8,849,254, which is a continuation-in-part of application No. 12/642,058, filed on Dec. 18, 2009, now Pat. No. 8,224,348.

(51) Int. Cl.
*H04L 29/08* (2006.01)
*H04L 29/06* (2006.01)

(58) Field of Classification Search
CPC ... H04W 60/04; H04W 64/003; H04W 68/00; H04W 84/042; H04W 84/12; H04W 88/02; H04W 8/08; H04W 8/20; H04L 67/18; H04L 67/24; G01S 5/0027; G06F 17/30592; G06Q 10/063; G08G 1/207; H04M 15/04; H04M 15/47; H04M 15/58; H04M 1/72572; H04M 2203/6027; H04M 2215/0148; H04M 2215/0188; H04M 2250/10; H04M 3/2218
See application file for complete search history.

(56) References Cited

U.S. PATENT DOCUMENTS

| | | | |
|---|---|---|---|
| 5,327,144 A | 7/1994 | Stilp et al. | |
| 5,608,410 A | 3/1997 | Stilp et al. | |
| 5,819,238 A | 10/1998 | Fernholz | |
| 5,959,580 A | 9/1999 | Maloney et al. | |
| 5,963,940 A | 10/1999 | Liddy et al. | |
| 6,006,225 A | 12/1999 | Bowman et al. | |
| 6,092,100 A | 7/2000 | Berstis et al. | |
| 6,108,555 A | 8/2000 | Maloney et al. | |
| 6,119,013 A | 9/2000 | Maloney et al. | |
| 6,169,899 B1 | 1/2001 | Havinis et al. | |
| 6,184,829 B1 | 2/2001 | Stilp | |
| 6,243,696 B1 | 6/2001 | Keeler et al. | |
| 6,317,604 B1 | 11/2001 | Kovach, Jr. et al. | |
| 6,782,264 B2 | 8/2004 | Anderson | |
| 6,904,449 B1 | 6/2005 | Quinones | |
| 7,167,713 B2 | 1/2007 | Anderson | |
| 7,577,665 B2 | 8/2009 | Ramer et al. | |
| 7,603,360 B2 | 10/2009 | Ramer et al. | |
| 7,660,581 B2 | 2/2010 | Ramer et al. | |
| 7,783,299 B2 | 8/2010 | Anderson et al. | |
| 7,860,871 B2 | 12/2010 | Ramer et al. | |
| 8,224,348 B2 | 7/2012 | Bolon et al. | |
| 8,320,931 B2 | 11/2012 | Ward et al. | |
| 8,346,592 B2 | 1/2013 | Torvmark et al. | |
| 8,354,925 B1 | 1/2013 | Libby et al. | |
| 8,456,304 B2 | 6/2013 | van Doorn et al. | |
| 8,463,297 B2 | 6/2013 | Bull et al. | |
| 8,849,254 B2 | 9/2014 | Bolon | |
| 9,386,421 B2 * | 7/2016 | Bolon | H04W 4/028 |
| 2001/0051522 A1 | 12/2001 | Fukuzawa et al. | |
| 2002/0068583 A1 | 6/2002 | Murray | |
| 2002/0164995 A1 | 11/2002 | Brown et al. | |
| 2003/0096621 A1 | 5/2003 | Jana et al. | |
| 2003/0139190 A1 | 7/2003 | Steelberg et al. | |
| 2004/0249866 A1 | 12/2004 | Chen et al. | |
| 2006/0003775 A1 | 1/2006 | Bull et al. | |
| 2006/0019647 A1 | 1/2006 | Muhonen et al. | |
| 2006/0030333 A1 | 2/2006 | Ward et al. | |
| 2007/0061245 A1 | 3/2007 | Ramer et al. | |
| 2007/0061302 A1 | 3/2007 | Ramer et al. | |
| 2007/0073088 A1 | 3/2007 | Simon et al. | |
| 2007/0143013 A1 | 6/2007 | Breen | |
| 2007/0150195 A1 | 6/2007 | Koskan et al. | |
| 2007/0260531 A1 | 11/2007 | Bezancon | |
| 2008/0018464 A1 | 1/2008 | van Doorn et al. | |
| 2008/0119205 A1 | 5/2008 | Ichimura | |
| 2008/0162034 A1 | 7/2008 | Breen | |
| 2008/0194274 A1 | 8/2008 | Ko | |
| 2009/0029722 A1 | 1/2009 | Rutten et al. | |
| 2009/0098903 A1 | 4/2009 | Donaldson et al. | |
| 2009/0170528 A1 | 7/2009 | Bull et al. | |
| 2009/0207020 A1 | 8/2009 | Garnier et al. | |
| 2009/0248178 A1 | 10/2009 | Paulson et al. | |
| 2010/0185591 A1 | 7/2010 | Ichikawa | |
| 2010/0279712 A1 | 11/2010 | Dicke et al. | |
| 2011/0012781 A1 | 1/2011 | Ronald et al. | |
| 2011/0151839 A1 | 6/2011 | Bolon et al. | |
| 2012/0115504 A1 | 5/2012 | Zhang et al. | |
| 2012/0177010 A1 | 7/2012 | Huang et al. | |
| 2012/0226526 A1 | 9/2012 | Donovan et al. | |
| 2012/0319844 A1 | 12/2012 | van Doorn et al. | |
| 2013/0023247 A1 | 1/2013 | Bolon et al. | |
| 2013/0273914 A1 | 10/2013 | Speks | |
| 2013/0310070 A1 | 11/2013 | Anderson et al. | |

OTHER PUBLICATIONS

International Patent Application No. PCT/US2010/058983: International Search Report and Written Opinion dated Feb. 2, 2011, 8 pages.

European Patent Application No. 10838116.1; Extended Search Report; dated Mar. 9, 2016; 8 pages.

\* cited by examiner

LOCATION INTELLIGENCE MANAGEMENT SYSTEM FOR BORDER SECURITY

CROSS REFERENCE

This application is a continuation of U.S. patent application Ser. No. 14/057,629 filed Oct. 18, 2013, which is a continuation-in-part of U.S. patent application Ser. No. 13/490,745 filed Jun. 7, 2012, which is now U.S. Pat. No. 8,849,254, issued Sep. 30, 2014, which is a continuation-in-part of U.S. patent application Ser. No. 12/642,058, filed Dec. 18, 2009, which is now U.S. Pat. No. 8,224,348, issued Jul. 17, 2012, the contents of all of which are hereby incorporated by reference in their entirety.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to using location and identity information collected by wireless location systems (WLSs) and wireless communications networks (WCNs) to determine location, suspicious behaviors and then managing location generation resources based on location priorities, required quality of service and resource availability.

BACKGROUND

Location has always been a feature of mobile communications systems. With the advent of cellular radio systems, inherent in the functions of the wireless communications networks (WCNs) were the concepts of cell, sector, paging area and service area. These radio coverage areas created within the WCN had a one-to-one correspondence to geographic areas, but were of limited use in enabling location-based services outside of the provision of communications between the mobile device and the WCN.

As part of the Personal Communications System (PCS) auction of 1994, the Federal Communications Commission, at the behest of public safety agencies, added a requirement for the location of wireless emergency services calls for cellular and PCS systems. The FCC's wireless Enhanced 9-1-1 (E9-1-1) rules were designed to improve the effectiveness and reliability of wireless 9-1-1 services by providing 9-1-1 dispatchers and public safety agencies with geographic location information on wireless 9-1-1 calls. Location accuracy varied from the E9-1-1 Phase I rules which required that the existing WCN developed location information be converted to a geographic representation and made available to public safety agencies. Phase II of the FCC E9-1-1 rules called for high-accuracy location of emergency services wireless calls. Eventually both network-based and mobile-based techniques were fielded to satisfy the E9-1-1 Phase II high accuracy location mandate.

As realized and noted in extensive prior art, the ability to routinely, reliably, and rapidly locate cellular wireless communications devices has the potential to provide significant public benefit in public safety and convenience and in commercial productivity. In response to the commercial and governmental demand a number of infrastructure-based, handset-based and network-based wireless location systems have been developed.

Infrastructure-based location techniques use information in use within the WCN to generate an approximate geographic location. Infrastructure-based location techniques include CID (serving Cell-ID), CID-RTF (serving cell-ID plus radio time-of-flight time-based ranging), CIDTA (serving cell-ID plus time-based ranging), and Enhanced Cell-ID (ECID, a serving cell, time-based ranging and power difference of arrival hybrid). Signals that generate the WCN information that is the precursor to infrastructure-based location may be collected at the handset or at the base station and delivered to a mobile location server which has database knowledge of both the WCN topology and geographic topology.

Network-based location solutions use specialized receivers and/or passive monitors within, or overlaid on, the wireless communications network to collect uplink (mobile device-to-base station) signals, which are used to determine location and velocity of the mobile device. Overlay Network-based techniques include uplink Time-Difference-of-Arrival (TDOA), Angle-Of-Arrival (AOA), Multipath Analysis (RF fingerprinting), and signal strength measurement (SSM). Examples of network-based systems for the determination of locations for wireless mobile units are found in Stilp, et al., U.S. Pat. No. 5,327,144; Stilp, et al., U.S. Pat. No. 5,608,410; Kennedy, et al., U.S. Pat. No. 5,317,323; Maloney, et al., U.S. Pat. No. 4,728,959; and related art.

Mobile-device based location solutions use specialized electronics and/or software within the mobile device to collect signaling. Location determination can take place in the device or information can be transmitted to a landside server which determines the location. Device-based location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. An example of a GNSS system is the United States NavStar Global Positioning System (GPS).

Hybrids of the network-based and mobile device-based techniques can be used to generate improved quality of services including improved speed, accuracy, yield, and uniformity of location. A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM). Hybrids of the network-based techniques can be used to generate improved quality of services including speed, accuracy, yield, and uniformity of location.

The use of collateral information supplied to the Wireless Location System from the Wireless Communications Network or off-line databased to enable or enhance location determination in network-based systems was introduced in Maloney, et al., U.S. Pat. No. 5,959,580; and further extended in Maloney, et al., U.S. Pat. Nos. 6,108,555 and 6,119,013. These and related following descriptions of the prior art for infrastructure-based location determination systems enable robust and effective location-determination performance when adequate measurement data can be derived or are otherwise available.

Since the advent of direct dial cellular telecommunications in 1984, and especially in the past decade, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. Also, data services, such as short-message-service (SMS), packet data services (for example the GPRS (GSM General Packet Radio Service) and IP Multimedia Subsystem (IMS) have proliferated as has the number and variety of voice, data and voice-data capable wireless devices.

The air interface protocols now used in the wireless industry include AMPS, N-AMPS, TDMA, CDMA, TS-CDMA, OFDM, OFDMA, GSM, TACS, ESMR, GPRS, EDGE, UMTS, WCDMA, WiMAX, LTE, LTE-A and others.

The term CDMA will be used to refer to the CDMA digital cellular (TIA/EIA TR-45.4 defined IS-95, IS-95A, IS-95B), Personal Communications Services (J-STD-008), and 3GPP2 defined CDMA-2000 and UMB standards and air interfaces. The term UMTS will be used to refer to the 3GPP specified Wideband-CDMA (W-CDMA) based Universal Mobile Telecommunications System, defining standards, and radio air interface. The term WiMAX is used to denote the IEEE defined 802.16, "Broadband Wireless"; 802.20, "Mobile Broadband Wireless Access"; and 802.22, "Wireless Regional Area Networks" technologies. The present invention also applies to the 3GPP defined Long-Term-Evolution (LTE) and the 3GPP LTE-Advanced (LTE-A) system among others.

For further background information relating to the subject matter described herein, the reader may refer to the following patents and patent applications assigned to TruePosition Inc., or TruePosition's wholly owned subsidiary, KSI: U.S. application Ser. No. 11/965,481 entitled *"Subscriber Selective, Area-based Service Control"* (the entirety of which is hereby incorporated by reference) which is a continuation-in-part of U.S. application Ser. No. 11/198,996 entitled *"Geo-fencing in a Wireless Location System"*, which is a continuation of Ser. No. 11/150,414, filed Jun. 10, 2005, entitled *"Advanced Triggers for Location-Based Service Applications in a Wireless Location System"*, which is a continuation-in-part of U.S. application Ser. No. 10/768,587, filed Jan. 29, 2004, entitled *"Monitoring of Call Information in a Wireless Location System"*, now pending, which is a continuation of U.S. application Ser. No. 09/909,221, filed Jul. 18, 2001, entitled *"Monitoring of Call Information in a Wireless Location System,"* now U.S. Pat. No. 6,782,264 B2, which is a continuation-in-part of U.S. application Ser. No. 09/539,352, filed Mar. 31, 2000, entitled *"Centralized database for a Wireless Location System,"* now U.S. Pat. No. 6,317,604 B1, which is a continuation of U.S. application Ser. No. 09/227,764, filed Jan. 8, 1999, entitled *"Calibration for Wireless Location System"*, and U.S. Pat. No. 6,184,829 B1. Maloney, et al., U.S. Pat. No. 5,959,580; Maloney, et al., U.S. Pat. No. 6,108,555 and Maloney, et al., U.S. Pat. No. 6,119,013. Each of these is hereby incorporated by reference in its entirety.

SUMMARY

A Location Intelligence Management System (LIMS) is a data capture, storage and decision support system that utilizes available data (both past and real time) from multiple sources (such as wireless networks, wireless location network, and off line sources such as network information, geographic information, manually entered information and geo-spatial data) to optimize utilization (scheduling and selection) of wireless location resources across multiple users and entities to produce location-aware intelligence. The LIMS contains the algorithms, control logic, data storage, processors and input/output devices to analyze past and real time data obtained from multiple sources in combination or separately, to produce intelligence in the form of metadata not otherwise reasonably or easily obtained. These algorithms can iteratively use previous generated metadata to automatically contribute to new analysis, which will use both real data (past and real time) as well as metadata. Such analysis would produce information such as: identifying potential behaviors of interest, identifying specific mobile users associated with such behaviors of interest, associations between mobile device users and mobile device user identification when no public ID is available (such as with prepaid mobile devices). The LIMS can then manage Position Determining Equipment (PDE) location resource utilization based on a combination of factors including but not limited to location priority, location accuracy, wireless location system(s) capacity, the geographic distribution of PDEs, terrain, man-made information (known tunnels, buildings, bridges, etc.), network information (cell distribution, coverage, network topology, network status, etc.), for performing locations on traffic channels, control channels and data sessions.

In an illustrative embodiment, a LIMS comprises a controller computer, a first database configured to store network event historical data, and a second database configured to store metadata. The LIMS is configured with computer software to utilize data from multiple sources to produce location-aware intelligence. This includes the creation of geo-profiles for mobile devices. The geo-profiles include location and time information for the mobile devices.

Such geo-profiles can be analyzed to detect aberrant or potentially aberrant behaviors, or what we refer to as "behaviors of interest," or "behavior-based triggers". For example, as described below, an aspect of this embodiment is the LIMS' capability to detect behaviors of interest and identify specific mobiles or mobile users associated with such behaviors of interest. These behavioral complex triggers use the LIMS capabilities that allow radio or network events corresponding to specific messages or groups of messages to generate high and/or low accuracy location estimates. A triggering event that initiates location estimation may be a detection of a particular message or a field within a specific message. Over time, a database of historical information including mobile identifiers and triggered events is developed (collection phase). The data collection phase may target any mobile device, any set of mobile devices, or a specific area in the wireless communications network (WCN) service area. Selection of a mobile device may be by any of the detectable mobile or network identifiers associated with the mobile device. Data from the collection phase is then analyzed for suspect behaviors and an index probability is assigned to each mobile. The analysis phase may include information imported from off-line sources and may be performed periodically, ad hoc in response to a set triggering event, or manually at any time.

Illustrative examples of advanced LIMS scenarios include urban and rural smuggling tunnel detection and location, and the identification and location of smuggling drop sites from smugglers using low-flying aircraft. For example, in an illustrative embodiment, method for use by a wireless location system to detect unlawful border crossing activities comprises collecting data representing wireless device cellular events, where the data represents the locations of wireless devices as they are registering with a wireless communications network and the times of the cellular events. In addition, the method comprises analyzing the collected data representing wireless device cellular events in areas near a border to identify a collection of cellular events associated with an unlawful border crossing. The data concerning network events may include historical data and metadata, and the collection of cellular events may comprise a cluster of cellular events occurring within a defined geographic area. The cluster of cellular events may be in the area of a portal of an unlawful border crossing tunnel. Moreover, the collection of cellular events may comprise a string of cellular events along a flight path of an aircraft, wherein said flight path represents an unlawful border crossing. Additional aspects of the inventive subject matter are described below.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions.

Figure 1:
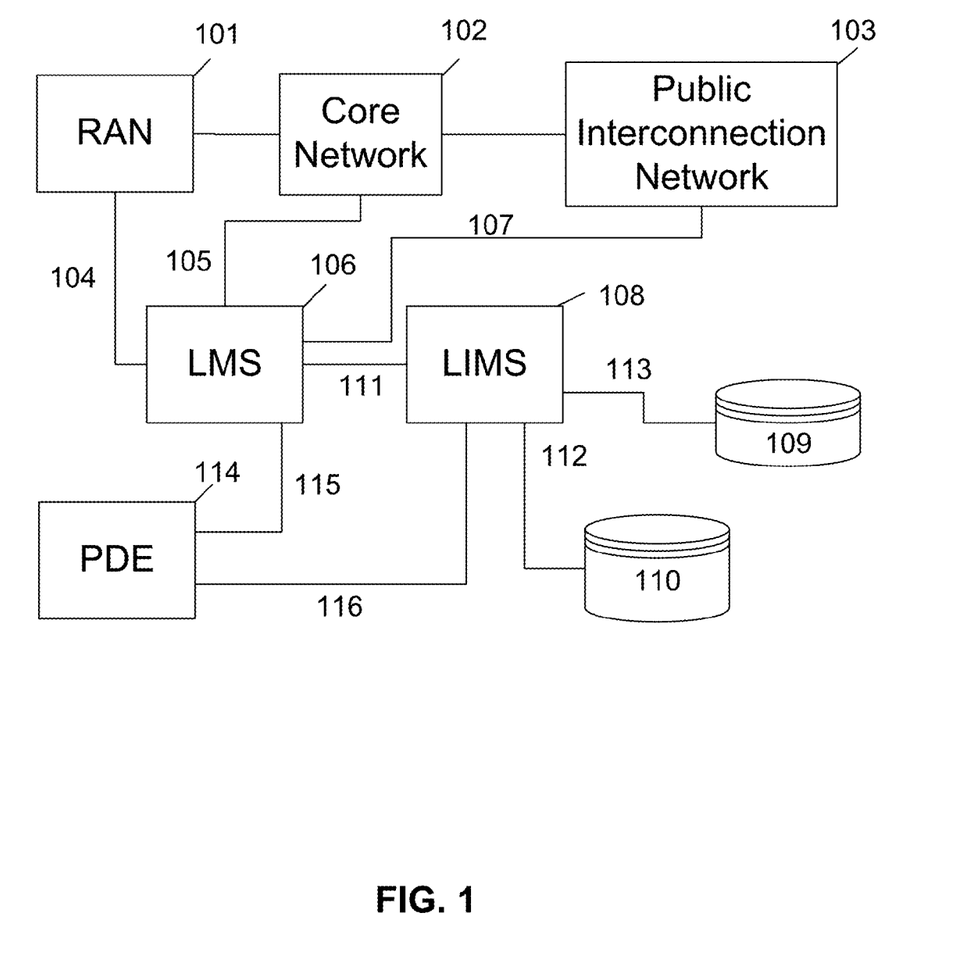
FIG. 1 schematically depicts a high level LIMS system in relation to other system nodes.

FIG. 1, High Level LIMS System

FIG. 1 illustrates the LIMS as deployed in a generic wireless communications Network (WCN). The Radio Access Network (RAN) 101 provides the radio link between the mobile device and the Core Network 102. Examples of a RAN network can include the Global System for Mobility (GSM), iDEN, Tetra, Universal Mobile Telephone System (UMTS), WiMAN, WiMAX, Long-Term-Evolution (LTE), Generic Access Network (GAN), and the IS-95/IS-2000 family of CDMA protocols among others. The Core Network provides the basic switching, routing, transcoding, metering, and interworking needed to connect and bill mobile-to-land, land-to-mobile, and mobile-to-mobile connections. The core network connects to landside networks and other mobile networks via the Public Interconnection Network 103 (nominally a SS7 network with trunking for circuit switched connections or a TCP/IP network for digital packet data connections.

The LIMS 108 subsystem is connected to the RAN 101 and Core Network 102 via the Link Monitoring System (LMS) 106. As disclosed in TruePosition U.S. Pat. No. 6,782,264, Aug. 24, 2004, "Monitoring of Call Information in a Wireless Location System," and U.S. Pat No. 7,167,713 "Monitoring of Call Information in a Wireless Location System" and then expanded in U.S. Published Patent Application 20060003775, filed Jun. 10, 2005, "Advanced Triggers for Location-based Service Applications in a Wireless Location System," an Abis Monitoring System (AMS) or Link Monitoring System (LMS) 106 can be deployed in conjunction with the wireless location system to supply a passive means of triggering and tasking the wireless location system. As cost savings measures, an LMS 106 may be deployed to monitor the Abis (BTS-to-BSC) link only or the required LMS functionality may be incorporated directly into the BSC. Full functionality of the LMS in identifying wireless transactions, network transactions, mobile identifiers, and subscriber identifiers requires that the example GSM network, the A, Abis, and GSM-MAP interfaces, be monitored. The LMS 106 functionality can be deployed as a network of passive probes reporting back to a central server cluster or as a software-based application for inclusion in wireless infrastructure, for example, the Base Station Controller (BSC) or Radio Network Controller (RNC). The LMS 106 connects to the RAN 101 via a digital data connection 104 and to the Core Network 102 via a digital data connection 105. The LMS 106 connects with the LIMS 108 via a digital data connection 111. The LMS 106 may optionally connect with the Position Determining Entity 114 via a digital data connection 115 in cases where triggers and filters, and priorities pre-set in the LMS 106 by the LIMS 108 require a minimum latency in initiation of the location signal collection and calculation.

The LIMS 108 is a set of generic computer servers and routers running specialized interconnected software applications and databases. The LIMS 108 connects via digital data links 112 113 to multiple databases which at minimum include a network event historical database 110 and a metadata database 109. The LIMS 108 is a decision support system that determines when and how accurate a specific wireless location needs to be and where to best obtain it from given current conditions (for example, how busy different PDEs are or the concentration of concurrent requests for locations in a given geographic area). The LIMS then manages PDE 114 location resource utilization based on a combination of factors including but not limited to: priority, accuracy, system(s) capacity, geographic distribution of PDEs, terrain, man-made information (such as, known tunnels, buildings, bridges), network information (cell distribution, coverage, network topology, network status), for performing locations on traffic channels, control channels and data session locations. Information on man-made features may include elevation and altitude data. Man-made features include transportation structures (bridges, overpasses, tunnels) as well as industrial and habitable structure information.

The LIMS 108 manages location resources based on prioritization level, resource availability, and demanded location quality of service. The LIMS 108 contains a decision support system (DSS) software application to automatically decide when to require a high accuracy location versus a lower accuracy location which does not require potentially limited PDE 114 location resources. The DSS application uses rules, databased location, identity, and transactional information (network or mobile events, time of day, geo-fence boundaries) to determine a set of scenarios based on a prioritized set of situational issues that generate metadata (which is stored in a metadata database) such as relationships between users, mobile devices, locations of interest and other mobile devices. Using the multidimensional histograms of activity and locations with dynamic conditional logic, the LIMS can determine association by proximity which can then be used as a triggering event or use location as a proxy to identity (metadata) users and relationships between users, groups and locations of interest. In setting the automatic real-time, high-accuracy location of mobile devices, the metadata analysis is used by the DDS application to compile an iterative, "Risk profile", escalating number on accumulation of weighted patterns and factors for each device, Mobiles with a high risk threshold, as determined by behaviors e.g. such as entry or exit to secured areas, communication with or proximity to known suspects, or communication patterns indicative of known avoidance patterns, are subjected to additional scrutiny and potentially flagged to users.

The LIMS 108 receives infrastructure-generated tasking information en mass from the LMS 106 to obtain data for real time processing of currently running algorithms, to populate the network event historical database 110 for future analysis as well as details required to enable the network based location system (PDE) to perform higher accuracy locations as required. The network event historical database 110 contains all events from all "simple" triggers set in the LMS, these events include mobile identifiers (such as IMSI, IEMI, MS-ISDN, TMSI, MSIN, GUTI, M/S-TMSI/IMEI-SV, C-RNTI) event details (such as called number, calling number, message type) as well as location information gleaned from the wireless network parameters obtained from the event reports. The LIMS 108 creates its own complex triggers from the combination of the real time flow of mass data into the operating algorithms, use of past network event historical data 110 and past metadata database 109 and use of the DSS that optimized PDE utilization previously mentioned.

Examples of the LIMS 108 capabilities enabled by the network event historical database 110 include geo-profile (locations and events as a function of time, probability and pattern analysis) determination, associations by proximity (correlation between two or more devices based on location proximity as a function of time and based on probability and pattern analysis in consideration of accuracy and other factors) based on histograms and conditional logic, detection of past patterns of evasive behavior (such as SIM swapping, use of multiple SIMs by the same user, use of multiple phones carried by the same user, turning mobile devices on only briefly, turning mobile devices off and on at specific locations frequently). The LIMS 108 can use a mobile's calling pattern and history for analysis, but more importantly, it can use non-call related information such as registrations and location updates for additional analysis to build improved geo-profiles and associations by proximity to then recognize suspicious behavior and events. (Such non-call related information, including registrations and location updates, are included within the term "cellular events" as that term is used herein.) The network event historical database 110 includes records on both messaging-related and WCN control events like location updates, handovers, power up IMSI attaches and power down de-registrations). Additionally, information from the metadata database 109 (containing non-wireless, non-transmitted or generated information) can be also be used in the decision matrix. For example, user entered information on geographic areas of interest, known special terrain conditions or specific case information can be used to add additional intelligence for filtering and correlative analysis. Additionally, the metadata database 109 contains data generated from past execution of algorithms (such as geo-fence operations, targeted surveillance activity) is maintained and can be used.

A geo-profile is created for each mobile device and will include the location of the mobile as a function of time for a specific time range or area of interest. Such geo-profile is metadata that is created from network transactions (single to multiple) monitored by the LIMS platform as well as from off-line sources and LIMS created meta-data derived from post-processing analysis and multi-transaction complex triggers. When a geo-profile of a mobile is focused on a specific area of interest, this is called a geo-fence profile.

For instance, a geo-fence profile can include where a mobile spent time in or out of a specific geographical area is recorded as a function of time, or as a time value as a function of area.

For each network transaction monitored, a network transaction record (NTR) is created and appended to the geo-profile. Analysis of the contents of the NTR may be in real-time or performed in a post-processing stage. The timing and priority of analysis may be based on any field in the NTR. Results of the analysis are then added to the geo-profile.

An example of the NTR is shown in Table 1 and illustrative details of the record are shown in Table 2. Exact details of the NTR contents are dependent on the probe system deployed. For instance, a wireless communications network based software-based probe (located in the GSM Base Station Controller, the UMTS Radio Network Controller, or the LTE Serving Gateway Mobility Management Entity) may deliver different information then a passive overlay/independent probe network.

TABLE 1

Network Transaction Record

| TS | ID | KEY | TRIG | EV | Cell | EXT | LOC | GEO | RISK |
|---|---|---|---|---|---|---|---|---|---|
|  |  |  |  |  |  |  |  |  |  |

TABLE 2

Network Transaction Record Detail

TS—this is the timestamp data for the triggering event
ID—this is the collected identification information for the mobile device (e.g. MSISDN, IMSI, IMEI, TMSI)
KEY—Any information for the network transaction that includes Encryption Key data (either collected by or delivered to the LIMS)
TRIG—The index to the triggering event
EV—The Event(s) descriptor and details. This is in addition to the triggering information and can include called number, calling number, location area
CELL—this field includes data about the wireless communications network. Example data includes serving Cell ID, Serving Cell Location, Serving Network Name, Network ID, Country Code, Country, Wireless Operator technology, and available Location Technology.
EXT—Extended information on WCN radio link such as timing parameters (e.g. Timing advance, Round Trip Time or Serving-One-Way-Delay) and link power (e.g. Measurement Reports, Network Measurement Reports, Code Power Measurements, or Pilot Strength Measurements). Both uplink and downlink information on the radio link
LOC—When a location is triggered, the Mobile Device TABLE 2-continued Network Transaction Record Detail location, velocity and uncertainties for location and velocity are stored.
GEO—Includes geo-fence information if mobile is interacting with a set Geo-fence area or boundary. This field includes Geo-Fence Name, Geo-fence breach, breach direction, Breach Type, Breach Frequency, Breach time.
RISK—A risk parameter is set for each mobile device and is set on the basis of each event, and each geo-fence. This field is incremented and decremented in accordance to the rules and priorities set by the LIMS operator.

In the U.S. Pat. No. 7,783,299, issued Aug. 24, 2010, entitled "*Advanced Triggers for Location-Based Service Applications in a Wireless Location System*", TruePosition introduced the basic concept of triggers allowing for the monitoring of WCN for events and transactions that would automatically cause a location attempt based on the pre-set triggers. Use of the LIMS 108 with its decision support system (DSS) and historical and metadata database(s) enable a new class of triggers based on an additional layer of logic and filtering based on historical or off-line data. The basic trigger delivered information and other data is processed by the DSS with a set of if-then-else rules combined with databased information on events, time-of-day, and geo-fence boundaries to create a database of metadata. The newly created metadata allows the LIMS to perform analysis where the location of a mobile is used as a proxy to identity, purpose and relationships with other mobile users. The same metadata can be used to enhance forward looking algorithms which in turn produce new complex triggers.

An example of a complex trigger than uses network event historical database 110 in conjunction with real time network information is a when two or more mobile devices exhibit the same location behavior over a period of time, such as being co-located while moving around for periods of time, implying they are traveling together, but there is no information in the historical database indicating they ever interact with each other (e.g. voice call, connection via data session or Short-Message-Service (SMS)). Then, the LIMS can decide to utilize high accuracy PDE resources to further verify or dispute this heuristic information. Such high accuracy locations would be based on real time network events, either passive or actively generated to determine location of said subjects at the same point in time. This can remain in operation for extended periods of time to increase confidence in the correlation.

Another example is the automatic detection of SIM swapping based on historical data as compared to the real time data coming in from the network. Once detected, the LIMS can then decide to trigger the PDE to locate the mobile(s) using high accuracy at that point in time or on a continuous basis depending on the user conditions set up in the LIMS such as location area where this occurs, time and day constraints, proximity to other known mobile devices, etc. Automatic use of high accuracy location helps build up a set of high accuracy information in the metadata database for a set of high risk mobile devices and their users for future correlation with other mobile devices, public events (such as crimes, public gatherings, etc.) sites and points of interest (such as tunnel entry/exit point, overlook observation points) as the high accuracy resources are limited and cannot be provided for every mobile and every network event.

Network Event historical database 110 (may actually be one or more databases) contains information on every network event transaction that occurs in the covered area for all mobile devices as configured. This could be reduced to a specific set of mobile devices via a list of identifiers for inclusion only or exclusion only. Said database contains selected information for each event including all available known identifiers of the specific mobile (one or more of the following: TMSI, IMSI, IMEI, MSISDN). It also includes event related information including the event type (such as hand over, mobile originated call, SMS received, etc.) and related event data such as dialed digits and timestamps. Additionally, each event contains relevant network information depending on the network type (cell site and TA for GSM, CI and SAI for UMTS, etc.). The network event historical database also includes some metadata for each specific event (not related to other events or combinations) which includes a calculated X, Y location based on best available location processing (including high accuracy) as well as additional identifiers populated (such as MSISDN) that may not have actually existed in the network event but are known to belong to the said mobile device through correlation previously provided in the LMS or LIMS.

Metadata database 109 (may actually be one or more databases) contains information that is input by users (manually or automatically) and information that is produced as a result of processes or algorithms on the LIMS 108. User input data can contain maps information including but not limited to streets, terrain, clutter, buildings, foliage, tunnels, pipelines, facilities (airports, bases), sites or areas of interest (such as buildings or border crossings points or geo-fence definitions), can also contain network information including but not limited to cell site locations, antenna sizes, azimuths, directions, down tilt, can include high accuracy location results for specific algorithms that have run in the past (such as geo-fence operations or surveillance operations) as well as specific information related to conditions and parameters used in past algorithm runs.

Figure 2:
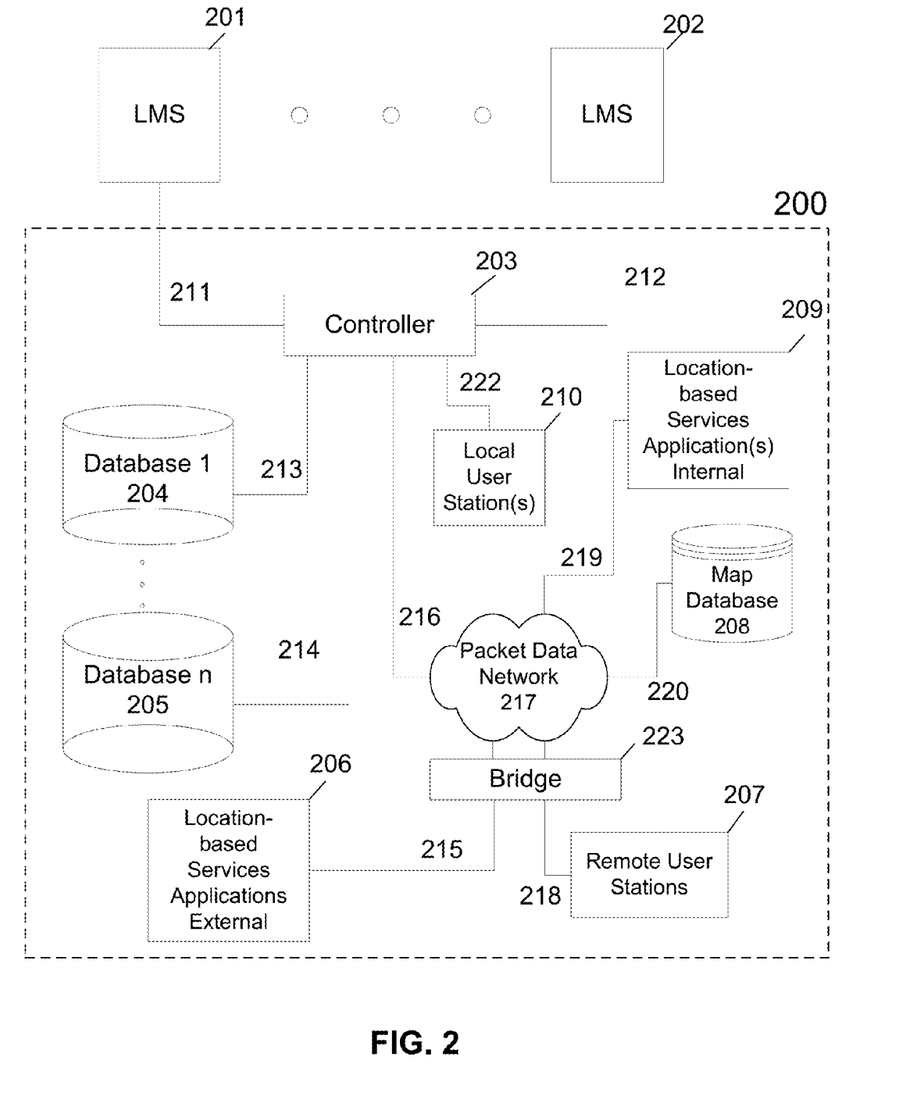
FIG. 2 illustrates functional subsystems of the LIMS system.

FIG. 2, Exemplary LIMS Network

FIG. 2 details an example of the LIMS network. In this example, the Link Monitoring Systems 201 202 are separate from the LIMS deployment 200, although in practice, the functionality could be combined on the same server platform or cluster of servers. The LIMS and LMS are deployed in a 1-to-1 or 1-to-many configuration based on needed capacity, number of wireless carriers to monitor, or geographic service area.

The LIMS controller 203 uses generic digital data interconnections to the LMS platforms 201 202. The controller 203 is both a packet router as well as a firewall providing authentication and access control. As part of the router function the controller 203 performs event scheduling, packet filtering and inter-subsystem communications. Provisioning, monitoring and control of the LMS network 201 202 is also performed via the controller 203 communications interfaces 211 212. Said controller 203 also contains the aforementioned control logic and algorithms for generating complex triggers and may be a single or cluster of servers.

The controller 203 directs LMS obtained wireless network transaction information to database 204 via a high speed database interface 213. Additional information such as high-accuracy location, association data (metadata), and sensor fusion (such as image recognition, photos, videometric identity) data may be stored on additional databases 205 that may be remotely housed or internal to the LIMS deployment 200 (as shown). The interface 214 to the other databases 205 is dependent on deployment specifics but can take the forms of any of a number of local-area-network (LAN), wide-area-network (WAN) or database specific interfaces.

The controller 203 allows for recovery of databased wireless network transaction information from the database 204 via 213 via the generic Ethernet interfaces 222 218 which interconnect the local user stations 210 and remote user stations 207.

The LIMS deployment's Local Area Network 217 offers packet data connectivity to all subsystems under the controller's 203 rules. The controller connects to the LAN 217 via Ethernet 216 as does the internal location-based services applications server 209 via link 219 and the Map database 208 via data link 220.

The local user stations 210 and remote user stations 207 via the controller 203 and the associated packet data network 217 have access to the databased wireless information 204, but also internal location-based services applications 209, external location-based services applications 206 and digital mapping database(s) 208. The external applications 206 and remote user stations 207 interconnections 215 and 216 may take the form of a variety of transport links which are translated by the Bridge 223. The Bridge 223 also supports additional authentication, access control, monitoring, and intrusion security for the external or remote components 206 207.

Over time, a database of historical information is developed (collection phase) of mobile identifiers and triggered events. The data collection phase may target any mobile device, any set of mobile devices, or a specific area in the wireless communications network (WCN) service area. Selection of a mobile device may be by any of the detectable mobile or network identifiers associated with the mobile device.

Data from the collection phase is then analyzed for suspect behaviors and an index probability is assigned to each mobile. The Analysis phase may include information imported from off-line, non-wireless sources. The Analysis phase may be performed automatically periodically, ad hoc in response to a set triggering event, or manually at any time.

Illustrative Examples of Advanced LIMS Scenarios

These illustrative examples are used to highlight the capabilities of the LIMS. Either network-based (U-TDOA, AoA, ECID) or mobile-based (A-GNSS, GNSS, OTDOA, ECID) wireless location techniques may be used to accomplish geo-location of mobile devices. Selection of the wireless location technique may be based on the mobile device's capabilities, the serving wireless communication network's capabilities or the operator's discretion. The use of network-based techniques is of an advantage when locating mobile devices in buildings since radio link power-control on the mobile device can overcome attenuation from the surrounding structure versus fixed power broadcasts such as those from orbiting satellites.

Another aspect of the LIMS capability is in the detection of behaviors of interest and identifying specific mobiles or mobile users associated with such behaviors of interest. These behavioral complex triggers use the LIMS capabilities, such as, e.g., the previously cited U.S. Pat. No. 7,783, 299, *"Advanced Triggers for Location-based Service Applications in a Wireless Location System,"* that allow for radio or network events (corresponding to specific messages or groups of over-the-air, inter-network or intra-network messaging) to generate high and/or low accuracy location estimates. A triggering event, one that initiates location estimation, may be a detection of a particular message or a field within a specific message. Examples of detectable network or radio events (also called network transactions) in a wireless communications network include: (1) Mobile originations/terminations; (2) SMS originations/terminations; (3) Mobile Attach/Detach (packet data) events; (4) Registration/Location/Routing Update (that is, a "location" update for the purposes of mobility and roaming as opposed to a network-based (U-TDOA, AoA, ECID) or mobile-based (A-GNSS, GNSS, OTDOA, ECID) location event; (5) Handovers; and (6) Call Releases.

Figure 3:
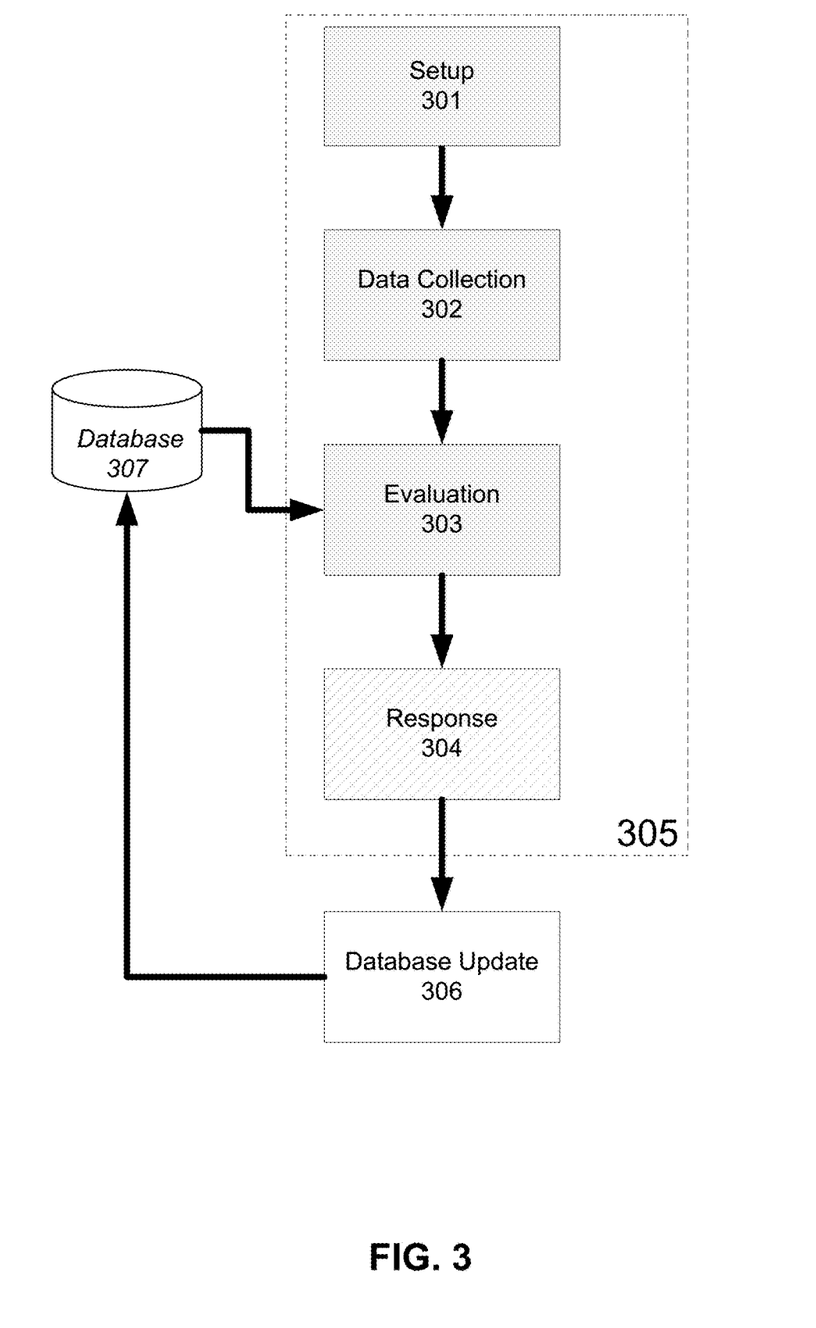
FIG. 3 depicts an example LIMS campaign.

FIG. 3, LIMS Campaign

FIG. 3 shows the high level procedural flow for a LIMS campaign. As described in U.S. Pat. No. 8,224,348 issued Jul. 17, 2012, included herein via reference, a Location Intelligence Management System (LIMS) is a data capture, storage and decision support system that utilizes available data (both past and real time) from multiple sources (such as wireless networks, wireless location network, and off line sources such as network information, geographic information, manually entered information and geo-spatial data) to optimize utilization (scheduling and selection) of wireless location resources across multiple users and entities to produce location-aware intelligence. The LIMS contains the algorithms, control logic, data storage, processors and input/output devices to analyze past and real time data obtained from multiple sources in combination or separately, to produce intelligence in the form of metadata not otherwise reasonably or easily obtained. These algorithms can iteratively use previously generated metadata to automatically contribute to new analysis, which will use both real data (past and real time) as well as metadata. Such analysis would produce information such as: identifying potential behaviors of interest, identifying specific mobile users associated with such behaviors of interest, associations between mobile device users and mobile device user identification when no public ID is available (such as with prepaid mobile devices). The LIMS can then manage Position Determining Equipment (PDE) location resource utilization based on a combination of factors including but not limited to location priority, location accuracy, wireless location system(s) capacity, the geographic distribution of PDEs, terrain, man-made information (known tunnels, buildings, bridges, etc.), network information (cell distribution, coverage, network topology, network status, etc.), for performing locations on traffic channels, control channels and data sessions.

As described in U.S. patent application Ser. No.: 13/490745, filed: Jun. 7, 2012, included herein via reference, the LIMS may be further configured with computer software to utilize data from multiple sources to produce location-aware intelligence including the creation of geo-profiles for mobile devices. The geo-profiles include location, event, and time information for the mobile devices.

Such geo-profiles can be analyzed to detect aberrant or potentially aberrant behaviors, or what we refer to as "behaviors of interest," or "behavior-based triggers". For example, as described below, an aspect of this embodiment is the LIMS' capability to detect behaviors of interest and identify specific mobiles or mobile users associated with such behaviors of interest. These behavioral complex triggers use the LIMS capabilities that allow radio or network events corresponding to specific messages or groups of messages to generate high and/or low accuracy location estimates. A triggering event that initiates location estimation may be a detection of a particular message or a field within a specific message. Over time, a database of historical information including mobile identifiers and triggered events is developed (collection phase). The data collection phase may target any mobile device, any set of mobile devices, or a specific area in the wireless communications network (WCN) service area. Selection of a mobile device may be by any of the detectable mobile or network identifiers associated with the mobile device. Data from the collection phase is then analyzed for suspect behaviors and an index probability is assigned to each mobile. The analysis phase may include information imported from off-line sources and may be performed periodically, ad hoc in response to a set triggering event, or manually at any time. Illustrative examples of advanced LIMS scenarios include area presence determination, association by proximity, detection of avoidance tactics, and general surveillance using secondary triggers.

The first stage of an active LIMS campaign 305 is Setup 301. The Setup 301 includes deployment of a LIMS system to cover the area of interest within the service area of a wireless communications network (WCN). The LIMS deployment options include standalone deployment, co-deployment with a Wireless Location System (WLS) and/or monitoring probes within the carrier infrastructure, and interconnection to the carrier network's administration or command and control framework. Although nominally deployed with a first WCN, a LIMS and associated wireless probes may be used to monitor radio events in geographically overlapping or neighboring WCN.

In data collection 302, the WLS, a network of wireless receivers and/or wired probes, provides the LIMS system with call-related data to build a database of events over time. Non-call related information (e.g. radio network information, geographic information, geo-spatial data, and manually entered information such as points of interest or timed/dated events) is also provided to the LIMS.

Data Collection 302 may also include the entry of additional historical call data loaded into LIMS from the wireless carrier'(s) Home Location Register (HLR), Home Subscriber Server (HSS), Billing records, call detail Records database(s) or other call/caller related information such as that retained for production in law enforcement requests for call data. Loading of such historical data could be used to extend the LIMS database in time or in coverage, or to configure the LIMS for use in a standalone deployment.

Once call information is being gathered or loaded, the LIMS can begin analyzing the call data. In the data evaluation 303, a set of rules for analysis of the data is entered. The combination of call data, filters such as geo-fences and time-of-day are used to build complex triggers that, when then used with off-line data 307, is then used to create metadata for each call or caller. The newly created metadata allows the LIMS to perform analysis where the location of a mobile is used as a proxy to identity, purpose and relationships between mobile users. The same metadata can be used to enhance forward looking algorithms which in turn produce new complex triggers which then can be used for further analysis.

When, during evaluation 303, the rules for analysis flag a call, caller, or group of calls, a response 304 is called for. This response 304 may be customized and prioritized, e.g. the response could be an alarm to the operator terminal, generation of an ad hoc report, generation of entry in a periodic report, or an immediate real-time automated response dependent on the level of integration between the LIMS and non-LIMS systems.

Once the active campaign 305 has ended, the results of the evaluation 303 (the rule set, metadata, generated triggers) and any data generated in the response 304 may be stored as offline data in a database 307 for logging or reuse in later campaigns.

Figure 4A:
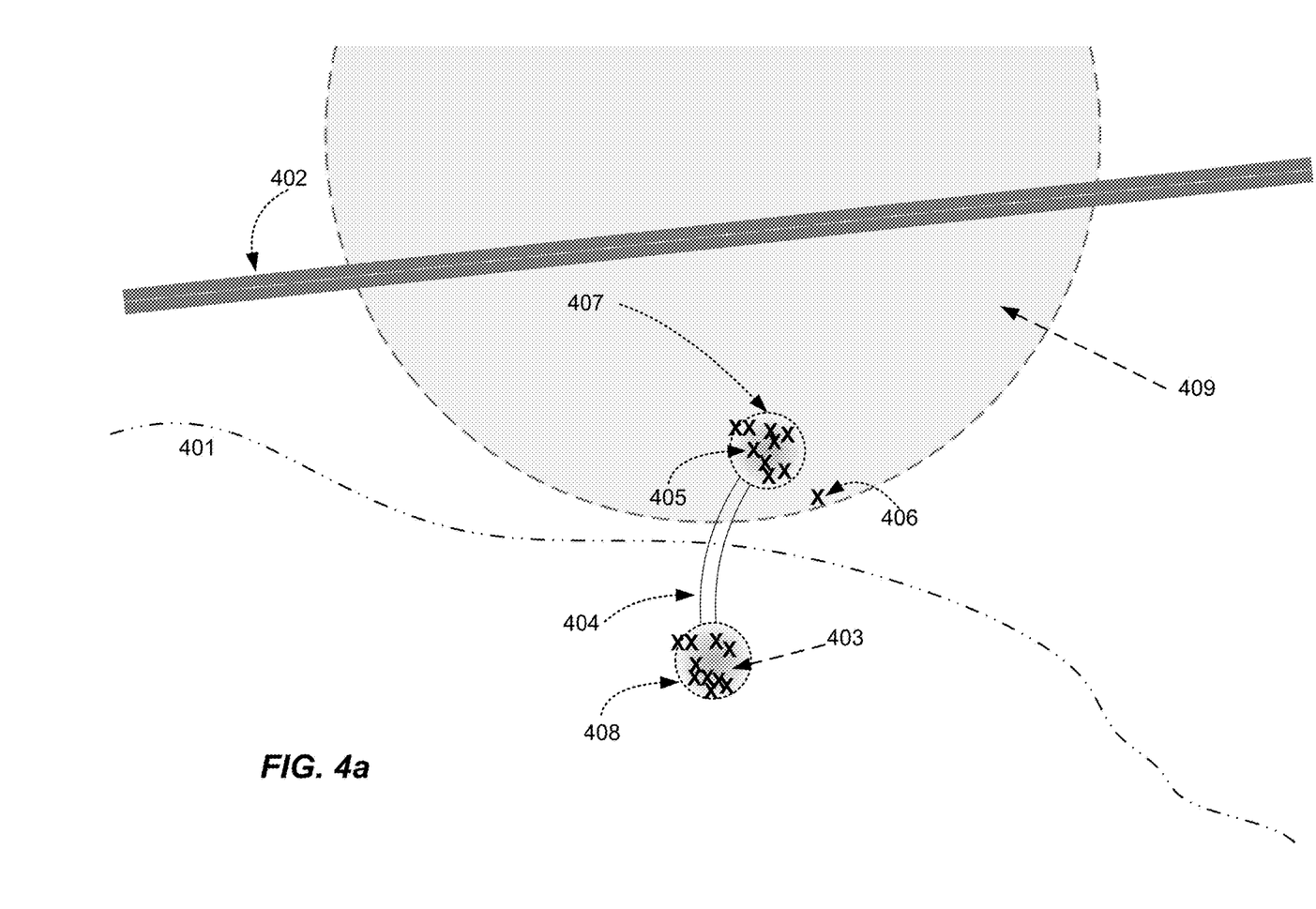
FIG. 4a depicts the direct location of a tunnel mouth in a rural area by mobile device emissions.

FIG. 4a, Location of Tunnel Portal

FIG. 4a illustrates a rural scenario for location of a tunnel portal. An international border 401 exists between relatively uninhabited areas of separate countries. A road 402 roughly parallels the border. No official border crossings exist in the local area. The border 401 is walled or fenced or under continuous surveillance by cameras or other sensors. The local Wireless Communications Network (WCN) provides radio coverage 409 over the second, near side tunnel mouth 405.

A first, far side tunnel mouth 403 has been dug and a border-crossing tunnel 404 constructed with the second portal 405 on the other side of the border 401. The tunnel mouths 403 404 have been concealed by camouflage, vegetation, or dug out so terrain features preclude easy observation from the road 402.

Under observation of the LIMS system, collection and analysis of radio network transaction information from the area is performed. For instance, registrations, SMS, call originations/terminations, data transfers, attachment events, and control messaging may all be observed. In this example, registrations from mobile devices emerging from the tunnel 404 are noted and located to high precision. The LIMS PDE receivers can be placed so as to maximize the precision over a local area. The LIMS PDE receivers can also be tuned to receive registrations from over the border 401 and determine and locate a second cluster of registrations on the foreign WCN if the tunnel mouth 403 is being used as an exit.

The resulting cluster of registrations 407 408 can then be used to locate the tunnel mouths 403 405. By using a threshold for registrations as well as time-of-day, weather conditions, seasonality, or geology, false positives can be reduced. Over time, even solitary power-up registrations 406, not associable to a cluster 405 can accumulate and lead to tunnel mouth discovery.

Figure 4B:
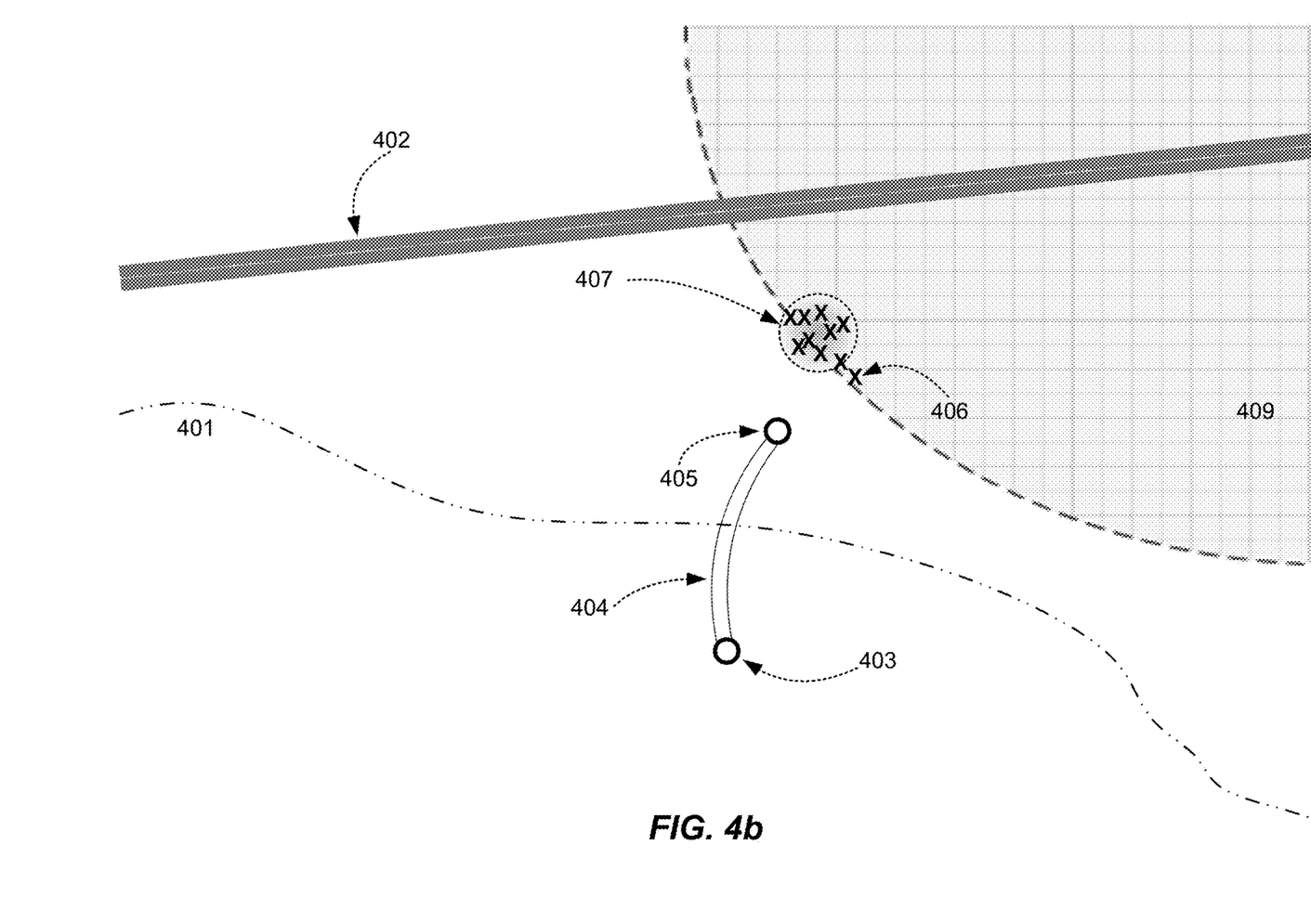
FIG. 4b depicts the indirect location of a tunnel mouth in a rural area by mobile device emissions.

FIG. 4b, Alternate Scenario for Location of Tunnel Portal

FIG. 4b illustrates an alternate rural scenario for location of a tunnel portal. An international border 401 exists between relatively uninhabited areas of separate countries. A road 402 roughly parallels the border 401. No official border crossings exist in the local area. The border 401 is walled or fenced or under continuous surveillance by cameras or other sensors.

A first tunnel mouth 403 has been dug on the far side of the border and a border-crossing tunnel 404 constructed with the second mouth 405 on the near side of the border 401. The tunnel mouths 403 405 have been concealed by camouflage, vegetation, or dug out so terrain features preclude easy observation from the road 402.

The local Wireless Communications Network (WCN) does not provide radio coverage 409 over the second tunnel mouth 405 but does cover the nearby roadway 402 with radio coverage 409. Once idle mobile devices come into the coverage area 409, they quickly attempt to register with the local WCN. The non-local WCN (not shown) on the far side of the border does not provide coverage to the area over the border.

Under observation of the LIMS system, collection and analysis of radio network transaction information from the area is performed. For instance, registrations, SMS, call originations/terminations, data transfers, attachment events, and control messaging may all be observed. In this example, registrations from mobile devices entering the coverage area 409 are noted and located to high precision. The resulting cluster of registrations 407 can then be used to assist in the location of the second tunnel mouth 405. By using a threshold for registrations as well as time-of-day, weather conditions, seasonality, or geology; false positives can be reduced. Over time, even solitary power-up registrations 406 from mobiles devices turned off before leaving the tunnel 404, not associable in real-time to a cluster 405 can accumulate and lead to localization of a trail that leads to a tunnel mouth 405.

Figure 5:
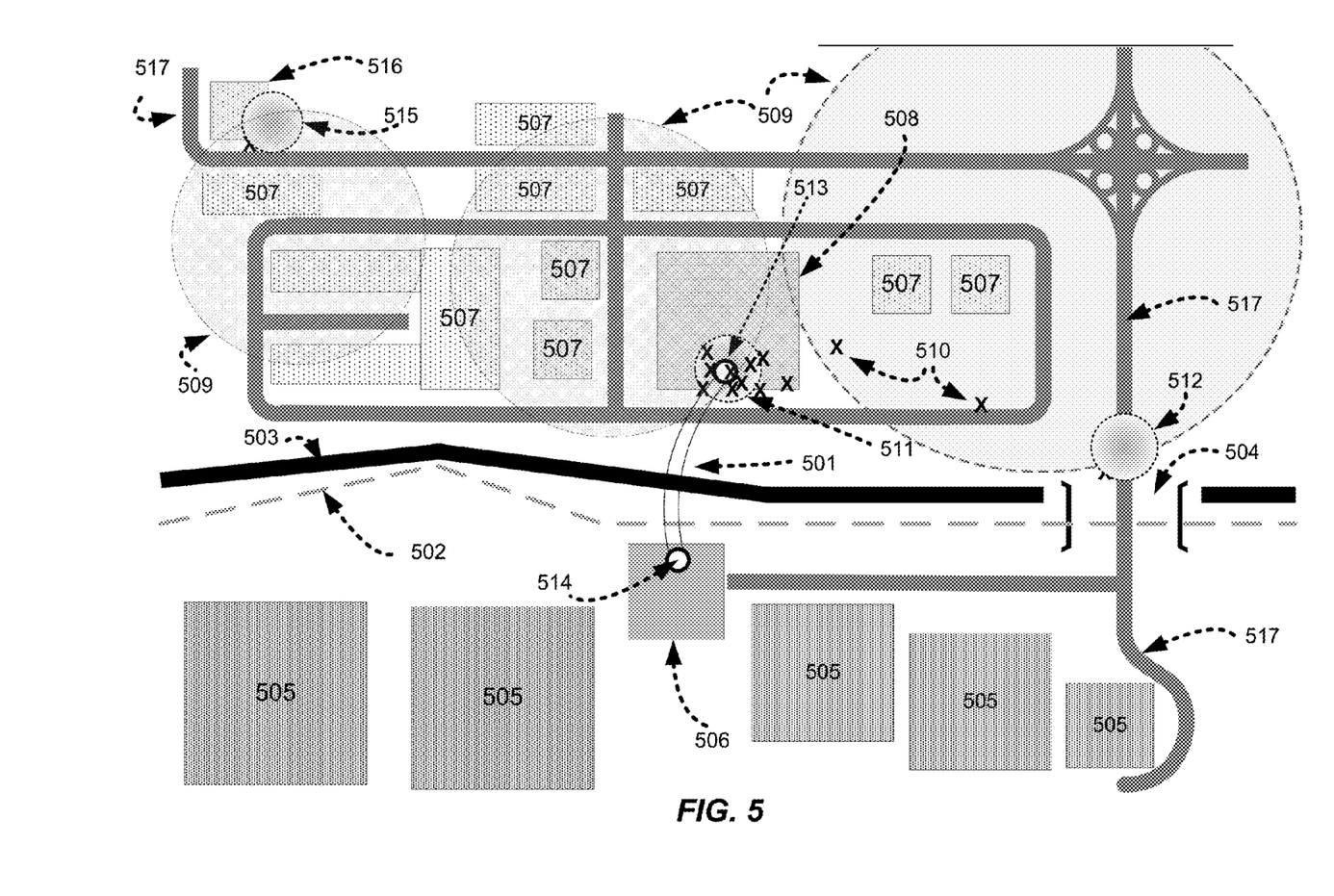
FIG. 5 depicts locating a tunnel opening in an urbanized area.

FIG. 5, Location of Tunnel Mouth in Urban Area

FIG. 5 is a sequential illustration of the location of tunnel mouth using LIMS in an urbanized area. In this illustrative scenario, a border crossing tunnel 501 has been dug between a first 506 and second 508 buildings going underneath the border 502 and border defenses 503. The buildings provide concealment of the first tunnel mouth 514, the second tunnel mouth 513 as well as any digging equipment, extracted soil, people and/or smuggled (or to-be-smuggled) goods.

The border control in this example scenario is already enforced by a border wall 503. A monitored border crossing 504 is served by a road and highway network 517 interconnecting both sides of the border. Distinct Wireless Communications Networks (WCNs) serve each side of the border with no or minimal cross-border coverage.

This urban scenario is complicated by the presence of buildings 505 506 on the first, far side of the border 502 and multiple buildings 507 508 516 on the second, near side of the border 502

Deploying and configuring a LIMS system with associated high-accuracy WLS to cover the area, a campaign collecting all call and caller data is performed. A geo-fence is constructed to detect entry into the area on the second, near side of the border. The geo-fence uses the available geo-spatial information determined from the wireless network configuration and use (cell, cell/sector, cell/sector and power, cell/sector and timing, cell/sector timing and power). For the area under observation of the LIMS system, collection and analysis of radio network transaction information from the area is performed. For instance, registrations, SMS, call originations/terminations, data transfers, attachment events, and control messaging may all be observed.

To detect the second, near side tunnel mouth 513, the LIMS initially uses location registrations (also known as paging area updates, routing area updates, tracking areas updates). Collecting and locating registrations, the LIMS removes those 512 geographically associated with the legitimate border crossing 504. A second cluster of registrations 515 is found. An initial evaluation finds the prevalence of registrations, initial attachment messaging and lack of previous entry into the LIMS database raising the risk metric for these phones and the building 516 geographically associated with the cluster 515. However; upon evaluation with off-line data, the cluster 515 was found to be associated geographically with a wireless carrier store and therefore removed from consideration. Non-clustered registrations 510 are noted and kept for further, future evaluation.

In one specific cell 509 of the geo-fenced area, a cluster of registrations 511 was located. Upon evaluation, it was found that many of the mobile devices were new to the LIMS database and registration included attachment messaging. Based on the evaluation, the building 508 geographically associated with the suspicious cluster 511 was reported for observation and potential searches for the tunnel mouth 511 and any smuggled goods or people.

Figure 6:
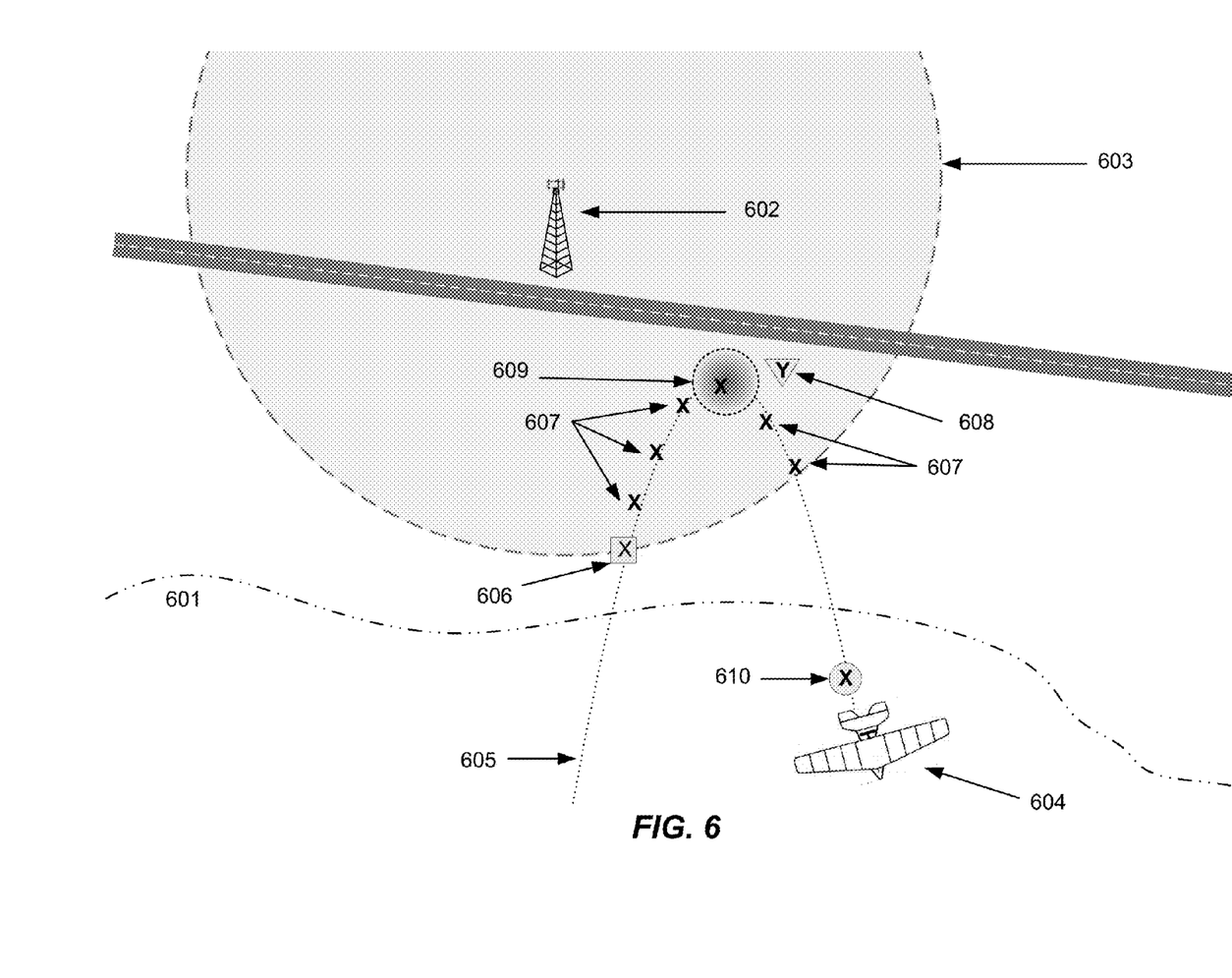
FIG. 6 depicts the detection and location of a low-altitude aerial smuggling drop.

FIG. 6, Over the Border Airdrop Detection

FIG. 6 geographically illustrates over the border airdrop detection using LIMS. Under observation of the LIMS system, collection and analysis of radio network transaction information from the area is performed. For instance, registrations, SMS, call originations/terminations, data transfers, attachment events, and control messaging may all be observed.

In FIG. 6, an over-the-border incursion by a light aircraft (e.g. an ultralight aircraft) is depicted. In this illustrative scenario, the border 601 is wall, fenced, patrolled or otherwise under observation. Smugglers use light aircraft and commercial wireless communications (e.g. cell phones) to smuggle goods over the border 601. The aircraft 604 follows a flight path 605 that stays comparatively low to the ground, under-the-radar, to prevent detection.

Upon entering 606 the coverage area 603 of the local base station 602, the mobile device carried by the pilot registers with the local WCN. The registration 606 is noted and located by the LIMS's PDE component. The location data (which includes speed, bearing and potentially altitude) allows LIMS to classify the mobile device as an aerial incursion (for instance, map data shows proximity to the border 601 and no road surface associated with the location, speed and bearing).

The LIMS then uses the real-time connection to the WCN network (for instance via a Mobile Positioning Center (MPC), Gateway Mobile Location Center (GMLC) or similar facility) and the highest accuracy wireless location system available to ping the Mobile-device-Of-Interest (MOI) (e.g. using AnytimeInterrogation (ATI), null SMS, or wireless network-technology specific silent messaging mechanism). Repeated pings of the MOI allow repeated high accuracy locations 607 and plotting of the flight. The furthest incursion area 609 is noted based on the flight plot and in this scenario, the proximity to a road. The LIMS notes the furthest incursion area 609 and continues to ping the MOI until communications is lost.

Using call data for the serving cell 602, the LIMS searches its database for a call between the MOI and any other mobile device. In this scenario, a second MOI 608 is discovered in the area and as being the sender of a call (or messaging) to the first, aerial MOI. Based on that call and the proximity to the predicted drop zone 609, the second MOI 608 is flagged for further tracking and reporting.

Using the over-the-border and cross-network capabilities of the LIMS and WLS, a registration event 610 of the aerial MOI may be detected and located over the border.

CONCLUSION

The true scope the present invention is not limited to the presently preferred embodiments disclosed herein. For example, the foregoing disclosure of a presently preferred embodiment of a Wireless Location System uses explanatory terms, such as LMS (Link Monitoring System), RNM (Radio Network Monitor), Serving Mobile Location Center (SMLC), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein are based on software applications running on generic hardware processing platforms and may be combined into the radio access network platforms such as the radio base station (e.g. the enhanced NodeB (eNB)) or into the Evolved Packet Core (EPC) entities such as the Mobility Management Entity (MME). These functional entities are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LIMS) described herein to another functional element (such as the PDE) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A system comprising:
one or more databases configured to store data associated with a plurality of mobile devices, wherein the data comprises one or more network events indicative of one or more registrations of each of the plurality of mobile devices with a wireless communications network (WCN);
a computing device in communication with the one or more databases, wherein the computing device is configured to:
determine, based on the data, a plurality of geo-profiles for the plurality of mobile devices, wherein each of the plurality of geo-profiles corresponds to a respective mobile device of the plurality of mobile devices, wherein each of the plurality of geo-profiles comprises:
time information comprising a time of a registration, with the WCN, of each respective mobile device of the plurality of mobile devices, and
location information comprising a location of each respective mobile device of the plurality of mobile devices at the time of the registration with the WCN;
determine, based on a correlation between a location of a registration in a first geo-profile of a first mobile device of the plurality of mobile devices and a location of a registration in a second geo-profile of a second mobile device of the plurality of mobile devices, an association between the first mobile device and the second mobile device; and
determine, in response to a time offset between a time of the registration in the first geo-profile of the first mobile device of the plurality of mobile devices and a time of the registration in the second geo-profile of the second mobile device of the plurality of mobile devices, that the association is an indirect association.

2. The system of claim 1, wherein the data comprises metadata related to a relationship between two or more of the plurality of mobile devices.

3. The system of claim 1, wherein the one or more registrations of each of the plurality of mobile devices with the WCN comprises a cluster of registrations occurring within a defined geographic area.

4. The system of claim 3, wherein the cluster of registrations is in an area of a portal of a tunnel.

5. The system of claim 1, wherein the one or more registrations of each of the plurality of mobile devices with the WCN comprise a string of registrations along a flight path of an aircraft.

6. The system of claim 1, wherein the computing device is further configured to be coupled to a link monitoring system (LMS), to store wireless network transaction information obtained by the LMS, and to store one or more of association data or sensor fusion data.

7. The system of claim 6, wherein the sensor fusion data comprises at least one of: image recognition data, photographic data, or videometric identity data.

8. The system of claim 1, wherein the computing device is further configured to:
determine, based on another location of a registration in the first geo-profile of the first mobile device of the plurality of mobile devices and another location of a registration in the second geo-profile of the second mobile device of the plurality of mobile devices, that the first mobile device and the second mobile device are co-located.

9. The system of claim 2, wherein the relationship between the two or more of the plurality of mobile devices is represented by data indicative of a communication session between the two or more of the plurality of mobile devices.

10. The system of claim 1, wherein the computing device is further configured to:
determine, based on the plurality of geo-profiles, a plurality of relationships between the plurality of mobile devices and a plurality of locations.

11. The system of claim 1, wherein the data associated with the plurality of mobile devices further comprises one or more mobile identifiers.

12. The system of claim 11, wherein the one or more mobile identifiers comprise one or more of an International Mobile Subscriber Identity (IMSI), an International Mobile Equipment Identity (IMEI), a Mobile Station International Subscriber Directory Number (MS-ISDN), or a Temporary Mobile Subscriber Identity (TMSI) identifiers.

13. The system of claim 1, wherein the data associated with the plurality of mobile devices further comprises network control events.

14. The system of claim 13, wherein the network control events comprise one or more of a location update, a handover, a power up IMSI attach, or a power down de-registration.

15. The system of claim 1, wherein the computing device is further configured to:
determine, based on the plurality of geo-profiles, a subset of the plurality of mobile devices that have entered a secured area; and
determine, based on the subset of the plurality of mobile devices, a respective plurality of mobile users associated with the subset of the plurality of mobile devices.

16. The system of claim 1, wherein the computing device is further configured to determine, based on an Area Presence Determination of the plurality of geo-profiles, whether a specific mobile device of the plurality of mobile devices was present in an area-of-interest (AOI) at a specific time.

17. The system of claim 1, wherein the computing device is further configured to determine, based on a geo-profile of a specific mobile device of the plurality of mobile devices, a user of the specific mobile device of the plurality of mobile devices.

18. The system of claim 1, wherein the computing device is further configured to determine, based on one or more of the plurality of geo-profiles comprising a location of each respective mobile device of the plurality of mobile devices at a time of a registration in an area near a border, one or more mobile devices of the plurality of mobile devices associated with an unlawful border crossing.

19. The system of claim 1, wherein the computing device is further configured to determine, in response to a time correlation between the time of the registration in the first geo-profile of the first mobile device of the plurality of mobile devices and the time of the registration in the second geo-profile of the second mobile device of the plurality of mobile devices, that the association is direct.

20. A method comprising:
storing data associated with a plurality of mobile devices, wherein the data comprises one or more network events indicative of one or more registrations of each of the plurality of mobile devices with a wireless communications network (WCN);
determining, based on the data, a plurality of geo-profiles for the plurality of mobile devices, wherein each of the plurality of geo-profiles corresponds to a respective mobile device of the plurality of mobile devices, wherein each of the plurality of geo-profiles comprises:
time information comprising a time of a registration, with the WCN, of each respective mobile device of the plurality of mobile devices, and
location information comprising a location of each respective mobile device of the plurality of mobile devices at the time of the registration with the WCN;
determining, based on a correlation between a location of a registration in a first geo-profile of a first mobile device of the plurality of mobile devices and a location of a registration in a second geo-profile of a second mobile device of the plurality of mobile devices, an association between the first mobile device and the second mobile device; and
determining, in response to a time offset between a time of the registration in the first geo-profile of the first mobile device of the plurality of mobile devices and a time of the registration in the second geo-profile of the second mobile device of the plurality of mobile devices, that the association is an indirect association.

21. The method of claim 20, further comprising determining, based on one or more of the plurality of geo-profiles comprising a location of each respective mobile device of the plurality of mobile devices at a time of a registration in an area near a border, one or more mobile devices of the plurality of mobile devices associated with an unlawful border crossing.

22. The method of claim 20, further comprising determining, in response to a correlation between the time of the registration in the first geo-profile of the first mobile device of the plurality of mobile devices and the time of the registration in the second geo-profile of the second mobile device of the plurality of mobile devices, that the association is direct.

23. The method of claim 20, further comprising determining, based on another location of a registration in the first geo-profile of the first mobile device of the plurality of mobile devices and another location of a registration in the second geo-profile of the second mobile device of the plurality of mobile devices, that the first mobile device and the second mobile device are co-located.

24. The method of claim 20, further comprising determining, based on a geo-profile of a specific mobile device of the plurality of mobile devices, a user of the specific mobile device of the plurality of mobile devices.

25. The method of claim 20, further comprising determining, based on the plurality of geo-profiles, a plurality of relationships between the plurality of mobile devices and a plurality of locations.

26. An apparatus comprising:
one or more processors; and
one or more memories storing data associated with a plurality of mobile devices, wherein the data comprises one or more network events indicative of one or more registrations of each of the plurality of mobile devices with a wireless communications network (WCN), and
wherein the one or more memories store processor executable instructions that, when executed by the one or more processors, cause the apparatus to:
determine, based on the data, a plurality of geo-profiles for the plurality of mobile devices, wherein each of the plurality of geo-profiles corresponds to a respective mobile device of the plurality of mobile devices, wherein each of the plurality of geo-profiles comprises:
time information comprising a time of a registration, with the WCN, of each respective mobile device of the plurality of mobile devices, and
location information comprising a location of each respective mobile device of the plurality of mobile devices at the time of the registration with the WCN;
determine, based on a correlation between a location of a registration in a first geo-profile of a first mobile device of the plurality of mobile devices and a location of a registration in a second geo-profile of a second mobile device of the plurality of mobile devices, an association between the first mobile device and the second mobile device; and
determine, in response to a time offset between a time of the registration in the first geo-profile of the first mobile device of the plurality of mobile devices and a time of the registration in the second geo-profile of the second mobile device of the plurality of mobile devices, that the association is an indirect association.

27. The apparatus of claim 26, wherein the processor executable instructions, when executed by the one or more processors, further cause the apparatus to determine, based on one or more of the plurality of geo-profiles comprising a location of each respective mobile device of the plurality of mobile devices at a time of a registration in an area near a border, one or more mobile devices of the plurality of mobile devices associated with an unlawful border crossing.

28. The apparatus of claim 26, wherein the processor executable instructions, when executed by the one or more processors, further cause the apparatus to determine, in response to a correlation between the time of the registration in the first geo-profile of the first mobile device of the plurality of mobile devices and the time of the registration in the second geo-profile of the second mobile device of the plurality of mobile devices, that the association is direct.

* * * * *